United States Patent [19]

Byers

[11] Patent Number: 4,475,809
[45] Date of Patent: Oct. 9, 1984

[54] APPARATUS FOR MODIFYING IMAGES ON PHOTOGRAPHIC FILM

[76] Inventor: Thomas L. Byers, P.O. Box 26624, Oklahoma City, Okla. 73126

[21] Appl. No.: 457,811

[22] Filed: Jan. 13, 1983

[51] Int. Cl.³ .................... G03B 27/10; G03B 27/68
[52] U.S. Cl. ..................................... 355/84; 355/52
[58] Field of Search .................. 355/52, 84, 79, 133

[56] References Cited

U.S. PATENT DOCUMENTS

| | | | |
|---|---|---|---|
| 2,286,883 | 6/1942 | Weber | 355/133 |
| 3,264,106 | 8/1966 | Alldis | 355/79 X |
| 3,743,415 | 7/1973 | Gilman | 355/52 |
| 3,927,942 | 12/1975 | Byers | 355/84 |
| 4,029,410 | 6/1977 | Richter | 355/52 |
| 4,105,328 | 8/1978 | Wasson et al. | 355/52 X |
| 4,268,166 | 5/1981 | Byers | 355/84 |
| 4,324,489 | 4/1982 | Byers | 355/84 |
| 4,390,272 | 6/1983 | Anderson | 355/84 |

Primary Examiner—Richard A. Wintercorn
Attorney, Agent, or Firm—Robert K. Rhea

[57] ABSTRACT

A photographic exposure apparatus for modifying graphic images by adding or subtracting image area in precise amounts from all defining edges of the graphic image as it is being exposed upon a light sensitive sheet, includes a chassis having a horizontal top. A film board, having an overlying light sensitive film, overlies the chassis top for movement in an orbital path relative to the chassis. A fixed position film carriage, supporting a film having an image to be reproduced, is superimposed on the film board in contiguous contact with the light sensitive sheet. A motor driven eccentric motion dial drive guide is connected with an under carriage supported by the chassis top and connected with the film board. The drive guide is manually adjusted and the motor energized for orbital movement of the film board in a path of predetermined magnitude during exposure of the image on the light sensitive sheet.

6 Claims, 15 Drawing Figures

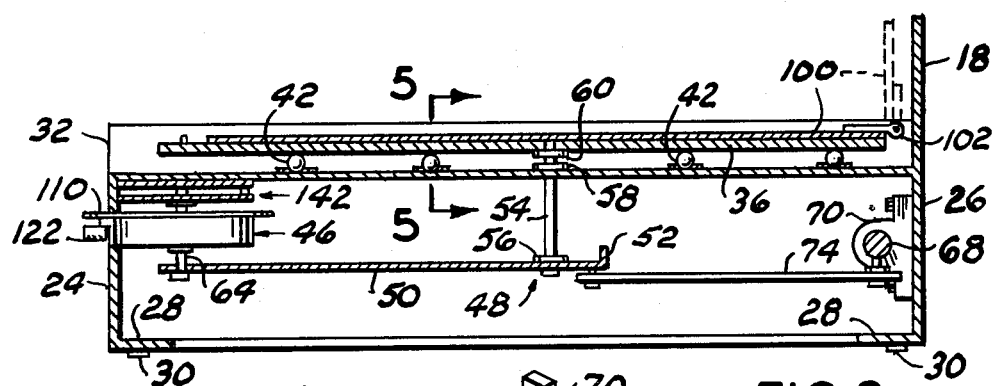
FIG. 3
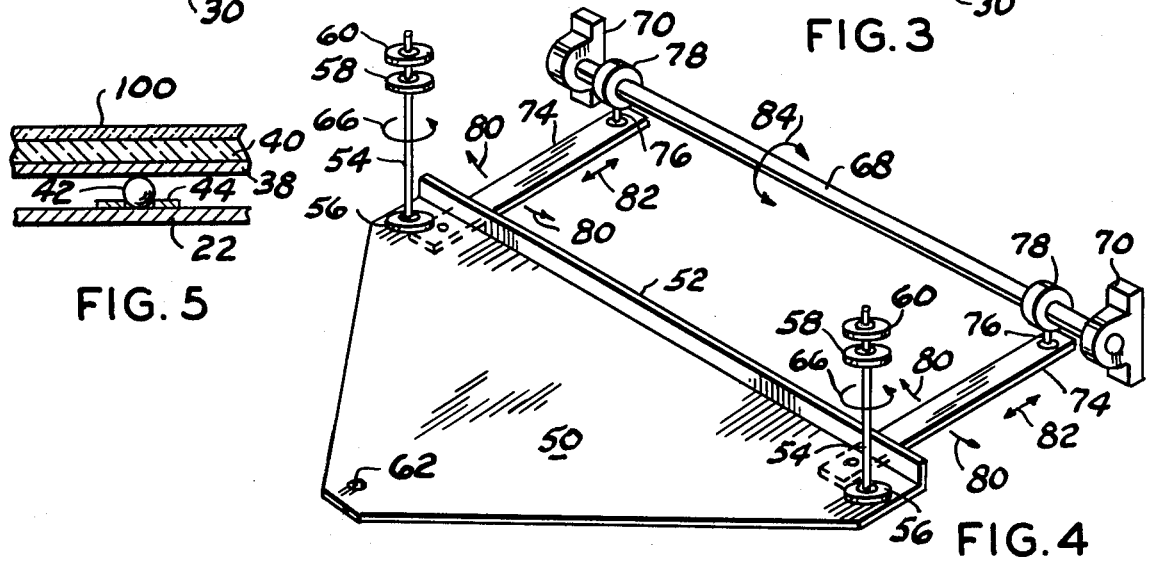
FIG. 5
FIG. 4
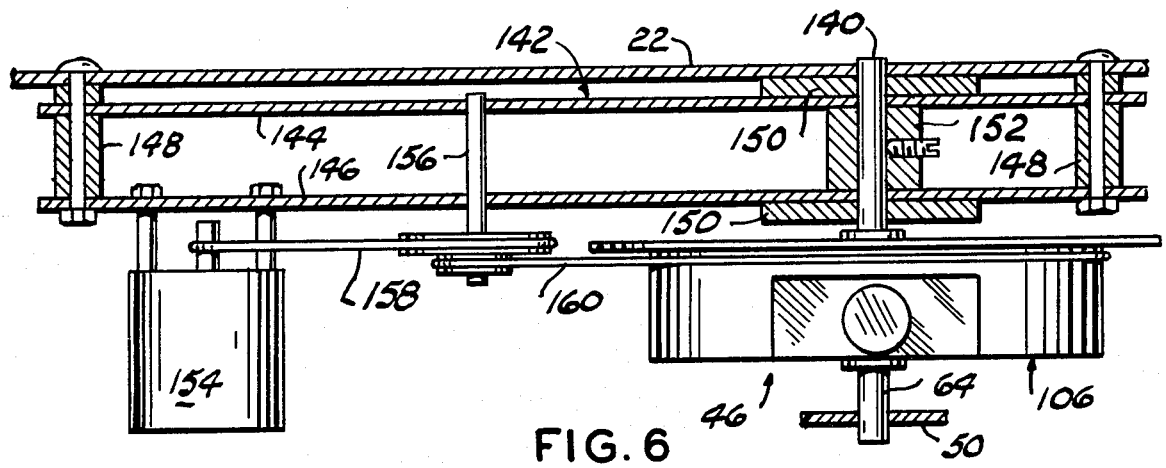
FIG. 6

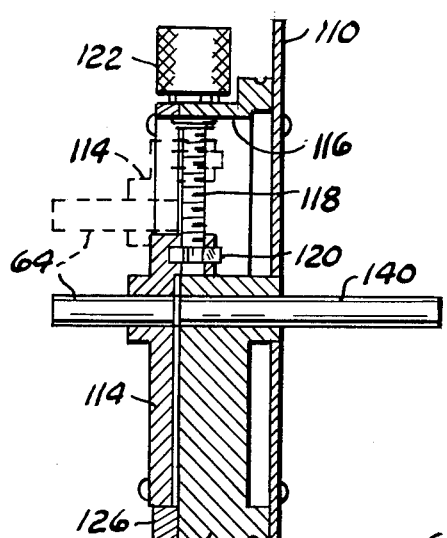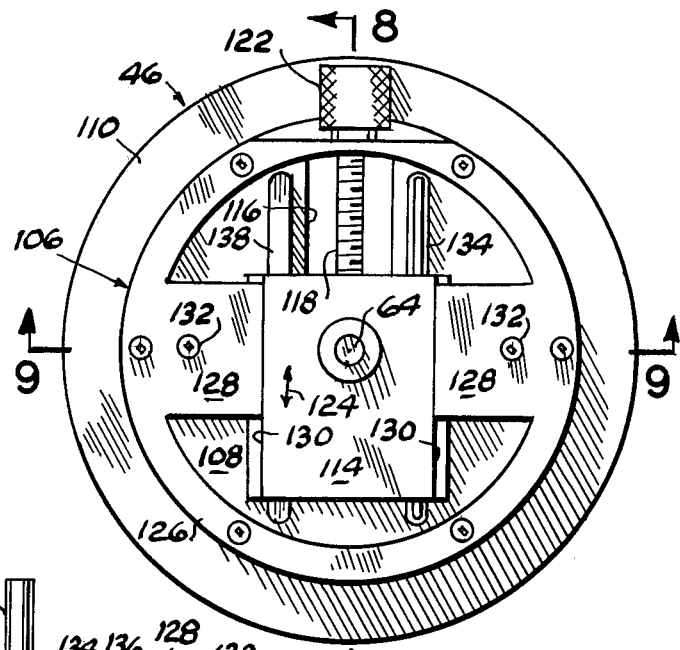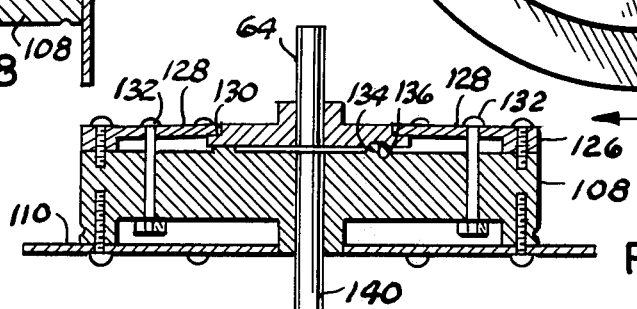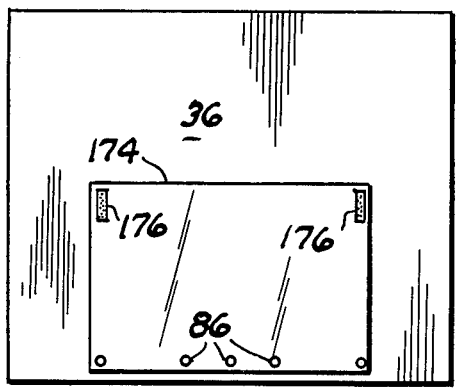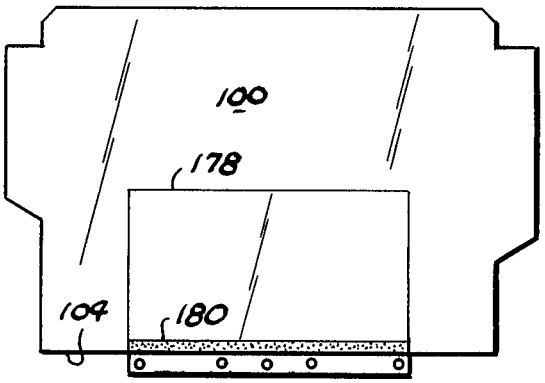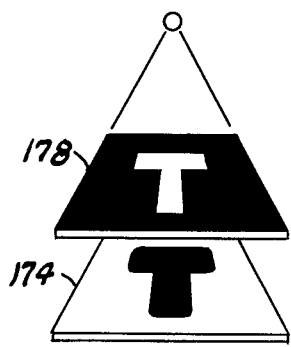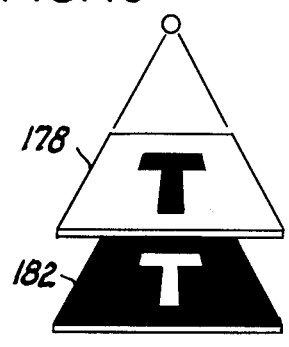

APPARATUS FOR MODIFYING IMAGES ON PHOTOGRAPHIC FILM

BACKGROUND OF THE INVENTION

1. Field of the Invention

The present invention relates to the preparation of reproducible artwork and more particularly to an apparatus for modifying images on photographic film.

In the graphic arts industry and the printed circuit industry it is often desirable and/or necessary to modify artwork images on photographic film for purposes that facilitate the production of the finished product and which will presently be explained.

The two similar modifications frequently required are: "adding to or subtracting from" a given amount of all defining edges of the image to be reproduced. Such modifications are commonly referred to as "swells, spreads, or plus images" or "shrinks, chokes, or minus images", respectively.

In graphic arts color printing when images of one color touch images of another color on the final printed sheet, it is required that one image overlap or underlap the other image slightly to compensate for imperfect register of sheets through the printing press. These overlaps or underlaps are obtained by making plus or minus images in the photographic stages before the printing plates are made.

In the printed circuit industry, circuit image bearing films known as "phototools" need to be modified slightly to compensate for inherent gains or inherent losses of image area during the process of printing and etching the circuit board. This requires that the phototool be modified accurately in increments of one thousandth of an inch or less. Another application is that of making a plus image film called a "solder mask" phototool from an original film bearing images of the circuit pads called a "pad master" phototool. The "pad master" when modified for example to a 0.020" plus image, becomes usable for a "solder mask" phototool which is necessary to circuit board production.

2. Description of the Prior Art

The most pertinent prior art is believed to be my U.S. Pat. No. 4,324,489 which generally functions satisfactorily, however, in making micro modifications of film being reproduced some disadvantages have been found. For example, this patent features a pair of wire-like rods capable of flexing and returning to a position of repose which connect a film or copy carriage sheet by a pair of pins to a chassis supported rocker arm wherein an orbital drive guide, also connected by an eccentric pin to the carriage sheet, generates an orbital motion to the carriage sheet relative to an underlying unexposed film. This arrangement requires the copy carriage sheet to be engaged and disengaged each time a film is loaded and exposed which promotes wear and inaccurate fitting of the pin receiving holes in the carriage sheet and the eccentric dial which produces inaccurate results following a setting of predetermined dimension for forming a choke or a spread. Further, the above patent features a register pin equipped registration bar for locating the original film in register with an unexposed film wherein the pin supporting registration bar must be lowered before activating the apparatus for its orbital motion. Failure of the operator to lower the registration bar out of the path of movement of the carriage not only produces unsatisfactory results but could damage the apparatus. Additionally, it was required to form the chassis of heavy weight rigid material, to maintain desirable tolerances during movement of the several components, which is undesirable from an economic standpoint.

The present invention overcomes the above and other disadvantages by hingedly mounting the film carriage sheet on the chassis by zero tolerance hinge pins for vertical pivoting movement toward and away from an underlying film board supported by the chassis and moved in an orbital motion by a motor driven eccentric dial moving an under carriage. The film board being connected with the under carriage and chassis by spherical bearing assemblies. The registration pins are mounted on the film board in forward spaced relation with respect to the film carriage sheet. This arrangement permits permanent engagement of the entire drive train which minimizes wear, provides stationary mounting of register pins for greater accuracy and easier operation, and substantially reduces the negative effect of chassis flex which permits the chassis to be formed from sheet metal. This arrangement greatly increases the accuracy of orbital settings without requiring higher tolerances in eccentric dial mechanism due to a reduction drive ratio provided by the spherical bearing assemblies.

SUMMARY OF THE INVENTION

A generally rectangular chassis, having a planar top and an upstanding backboard, is disposed in a photographic darkroom below a point light source controlled by light intensity and timing devices. A planar unexposed film support board centrally overlies the chassis top and its upper surface is scored or printed with lines representing the outside dimensions of standard film sizes. The film board is supported for orbital movement on the chassis top by a plurality of balls interposed therebetween. A transparent film carriage panel is hingedly connected to the chassis adjacent the backboard for receiving an image bearing film and is subsequently hinged forwardly and downwardly to overlie in contiguous contact the upper surface of the film board. A row of film registration pins is secured to the film board forwardly of the film carriage. The backboard is provided with scored lines of identical size and placement with respect to the film position lines on the film board.

A manually adjustable eccentric motion dial drive guide having an upstanding axial shaft or mandrel depending from and journalled by the chassis adjacent its forward limit is driven by a motor for moving the film board in an orbital path relative to the film carriage by an eccentric pin moving a film board under carriage. The under carriage being connected with the film board by drive rods extending through and fulcrumed by the chassis top in a manner to provide a desired orbital movement reduction ratio.

The purpose of the eccentric dial is to uniformly increase or decrease the image on the film supported by the film carriage when exposed on an underlying photographic film wherein the amount of increase or decrease is determined by the manually adjustable radius of the orbital motion imparted by the eccentric drive pin.

The principal object of this invention is to provide an apparatus by which consistent and uniform plus or minus images on the order of thousandths of an inch or tenths of a thousandth of an inch may be exposed on a light sensitive film from a film bearing an original copy image and in which the magnitude of movement may be visually observed prior to actuating the apparatus for film exposure and which may be easily and accurately repeated.

BRIEF DESCRIPTION OF THE DRAWINGS

FIG. 3 is a vertical cross sectional view, to another scale, partially in elevation, taken substantially along the line 3—3 of FIG. 2;

FIG. 4 is a perspective view of the orbital motion imparting under carriage;

FIG. 5 is a fragmentary vertical cross sectional view taken substantially along the line 5—5 of FIG. 3;

FIG. 6 is a vertical cross sectional view, to a larger scale, partially in elevation, taken substantially along the line 6—6 of FIG. 1;

FIG. 7 is a bottom view, to another scale, of the orbital motion eccentric dial drive guide;

FIGS. 8 and 9 are cross sectional views taken substantially along the lines 8—8 and 9—9 of FIG. 7;

FIGS. 10 and 11 are diagrams illustrating the preferred manner of registering films on the film board and film carriage, respectively;

FIGS. 12 and 13 are exploded perspective views of film illustrating two basic functions of the apparatus;

FIG. 14 is a top view of a film fragment containing a graphic image to be modified; and, FIG. 15 is an example of a plus image formed from the graphic image contained by the film of FIG. 14.

DESCRIPTION OF THE PREFERRED EMBODIMENT

Figure 1:
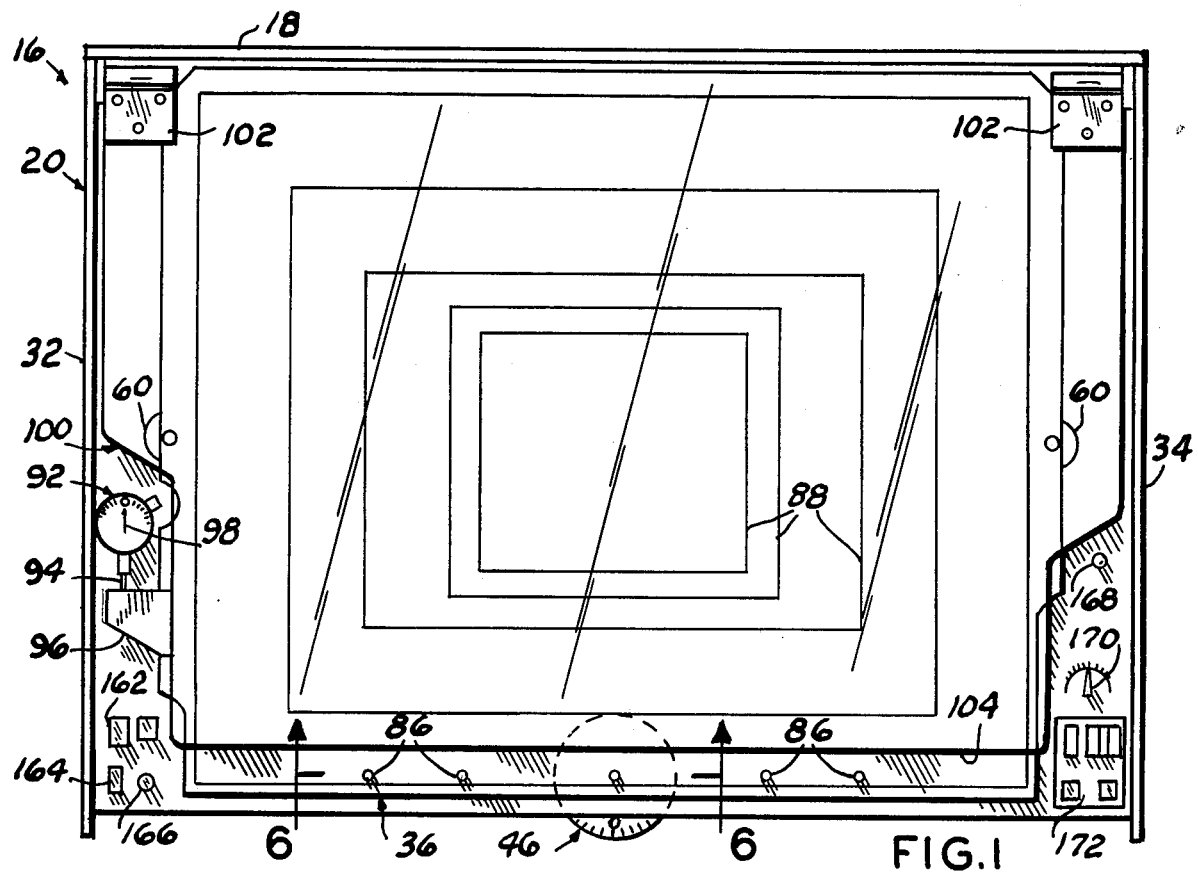
FIG. 1 is a top view of the apparatus.

Like characters of reference designate like parts in those figures of the drawings in which they occur.

In the drawings:

Referring to FIGS. 1 through 5, the reference numeral 16 indicates the apparatus which is rectangular box-like in general configuration characterized by a rearward upstanding backboard 18.

The apparatus includes a base or chassis 20 formdd by a horizontal top 22 joined to front and rear walls 24 and 28 with the depending end portion of the front and rear end wall turned horizontally inward in confronting relation, as at 28, for receiving leveling screws or feet 30. The rearward end wall 26 may be extended upwardly to form the backboard 18. Opposing side panels 32 and 34, coextensive with the chassis top 22, complete the box-like configuration and preferably extend upwardly above the upper limit of the top a selected distance for the purpose presently apparent.

A rectangular planar film board 36 of smaller dimension than the chassis top 22, preferably formed by a metallic sheet 38, having an overlying glass panel 40 bonded thereto, is supported in vertically spaced parallel relation on the chassis top by a plurality of balls 42 of selected diameter for orbital motion of the film board 36 relative to the top, as presently explained. The balls 42 are maintained at selected locations on the chassis top by a like plurality of washer-like retainers 44 secured to the upper surface of the chassis top 22 for coaxially receiving a spherical portion of the respective ball.

Orbital motion drive guide means 46, to be later explained in more detail, depends from the chassis top adjacent the forward wall 24 and is connected with an under carriage means 48 for imparting orbital motion to the film board 36. The under carriage means includes a substantially triangular sheet material panel 50, having the dimension of its base edge 52 at least coextensive with the transverse width of the film board 36, disposed in downwardly spaced parallel relation with respect to the chassis top 22. Respective end portions of the under carriage panel base are connected with vertically disposed drive rods 54 by conventional spherical bearings 56. The drive rods 54 project through the chassis top 22 and are secured thereto by identical spherical bearings 58 which form a fulcrum for the respective drive rod. The upper limit of the respective drive rod 54 projects through opposing side edge portions of the film board and are secured thereto by other spherical bearings 60. The apex of the under carriage panel 50 is provided with an aperture 62 closely received by an eccentric drive shaft or pin 64 depending from the eccentric dial motion drive guide means 46. The purpose of the spherical bearings is to permit orbital motion of the rods when the eccentric pin 64 moves the under carriage panel 50 so that respective end portions of the drive rods 54 describe orbital paths, as indicated by the arrows 66, and consequently an orbital motion of the film board 36, as presently explained in more detail.

A countershaft 68 extends between the side panels 32 and 34 inwardly of the rear wall 26 and is journalled at its respective ends by pillow block bearings 70. A pair of strap-like arms 72 are respectively secured at one end portion to the respective end portion of the under carriage 50 adjacent its base edge 52 and project rearwardly in parallel relation underlying the respective end portions of the countershaft 68. The respective rearward end portion of each arm 72 is connected by a spherical bearing 74 to a stub shaft 76 depending from a collar 78 surrounding and secured to respective end portions of the countershaft 68. The base edge 52 of the under carriage panel 50, countershaft 68 and arms 72 thus form a parallelogram maintaining the respective marginal edges of the film board 36 parallel with respect to the chassis end walls 24-26 and side panels 32-34 during orbital movement of the film board and movement of the drive rods 54 and arms 72 in the direction of the directional arrows 80 and 82. The countershaft 68 is angularly rotated to and fro in the direction of the arrow 84 during such movement.

Adjacent its forward edge, the film board 36 is provided with a row of conventional low profile film register pins 86 for registering film, as presently explained. The film board is further scored or printed with a plurality of lines 88 defining a plurality of rectangular box-like areas of different dimensions corresponding to standard size film sheets to be secured thereto within the respective box area during operation of the apparatus. The forward surface of the backboard 18 is similarly provided with a plurality of lines 90 cooperatively defining box-like areas of identical dimensions and placement with respect to the film board lines 88 for the purpose presently explained.

A conventional motion indicator 92 is mounted on the chassis top 22 between the film board 36 and side panel 32. The indicator 92 is provided with a contact 94 abutting the adjacent edge of a bracket 96 secured to the adjacent edge of the film board which biases the indicator arm 98 and visually indicates magnitude of movement of the film board in thousandths or tenths of a thousandth of an inch or centimeters. The purpose of the indicator 92 is to visually preset amplitude of movement of the film board prior to exposing film, as presently explained.

A transparent film carriage sheet 100, at least coextensive with the width of the film board 36, overlies the film board and is connected at its rearward lateral corner portions with the chassis adjacent the side panels 32 and 34 by a pair of hinges 102 having zero tolerance hinge pins for vertical pivoting movement of the carriage between the forward surface of the backboard 18 and the upper surface of the film board 36. The film carriage 100 extends forwardly and terminates with its forward edge 104 in parallel spaced relation with respect to the row of register pins 86.

Figure 2:
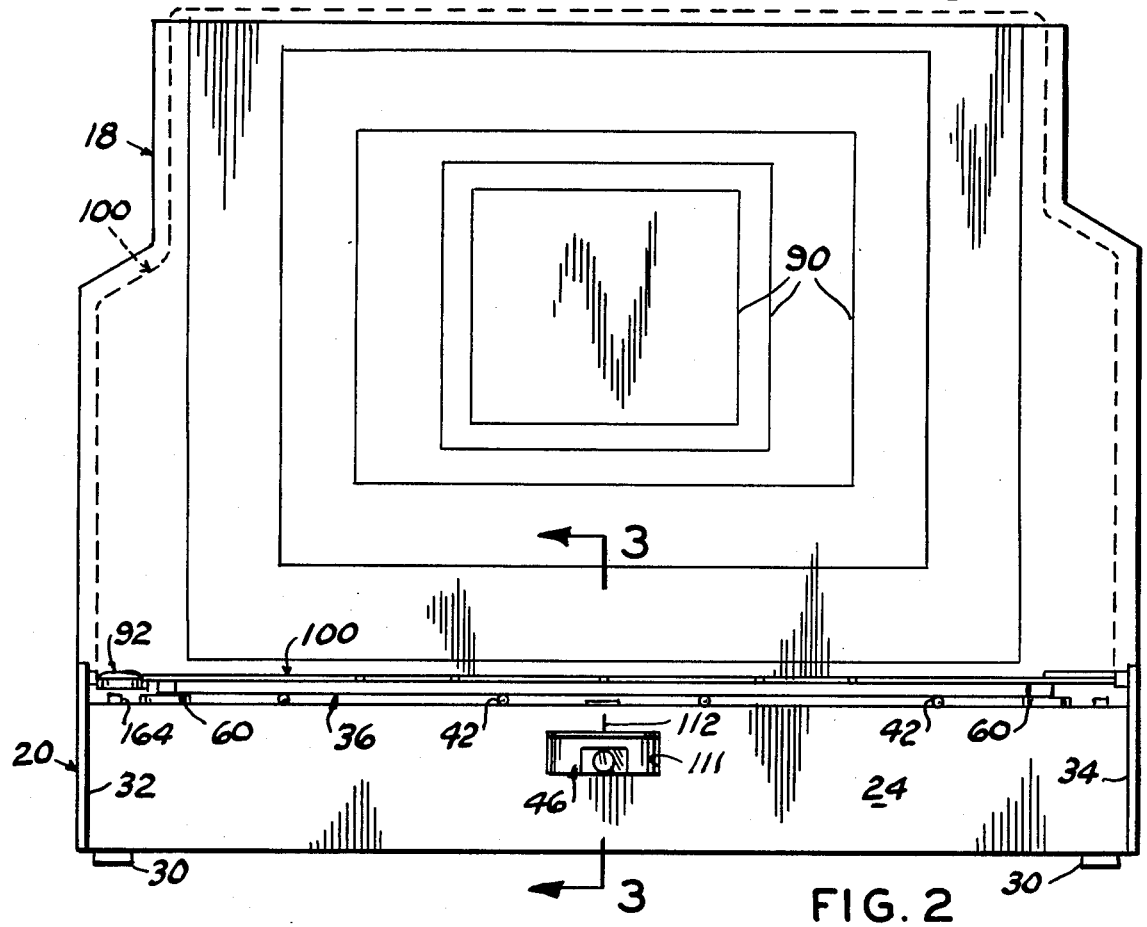
FIG. 2 is a front elevational view of FIG. 1.

Referring also to FIGS. 6 to 9, the eccentric motion guide means 46 (shown inverted by FIGS. 7 and 9) includes a dial guide 106 comprising a right circular cylindrical body 108 with its central axis disposed vertically and having a disk or dial plate 110 horizontally overlying and coaxially secured to its upper surface and projecting beyond the periphery of the body 108. A peripheral portion of the dial guide projects forwardly of the chassis end wall 24 through an opening 111 (FIGS. 2 and 3). The dial plate 110 is printed or scored with a zero position (FIG. 1) for alignment with a dial plate zero position line 112 (FIG. 2) scored on the outer forward surface of the chassis end plate 24. A slider plate 114 transversely underlies the body 108 for diametric movement. The body 108 is provided with a radial upwardly and downwardly open slot 116 through which a threaded shaft 118 extends horizontally and is connected at its inward end to the slider plate by a nut 120 disposed in a recess in the slider 114. The other end of the threaded shaft 118 is axially provided with a manual angularly rotated screw 122 for moving the slider 114 to and fro in the direction of the arrow 124. The slider 114 is maintained in contiguous contact with the body 108 by an annular bottom ring 126 diametrically equal with the body 108 and secured thereto.

The ring 126 is provided with a pair of inwardly projecting lugs 128 which overlie, at their spaced-apart confronting ends, a lateral rabbetted edge 130 on opposing sides of the slider. These lugs 128 are impinged against the slider by screws or bolts 132. The slider is guided in its diametric movement by an elongated V-shaped depending lug 134 integral with the body 108 and cooperatively nested by a cooperating groove 136 in the upper surface of the slider 114. The other longitudinal edge portion of the slider is slidably supported by an elongated depending lug 138 integral with the body 108.

In assembling the dial guide 106, the slider 114 is moved away from the thumb screw 122 until the nut supporting lug of the slider contacts the inward end of the slot 116 for a center position of the slider. The slider 114 and body 108 are then line drilled centrally of the body. The body bore tightly receives a dial shaft or mandrel 140 which projects above the dial plate 110 a selected distance. The motion drive pin 64 is press fitted into the bore of the slider 114 and depends therefrom a selected distance for connection with the under carriage panel 50.

The motion drive guide 106 is secured to the depending surface of the chassis top 22 medially its width and adjacent the forward wall 24 by bracket means 142. The bracket means 142 comprises upper and lower bracket plates 144 and 146 depending from the chassis top 22 and secured thereto by bolts and spacers 148. The bracket plates 144 and 146 are vertically line drilled and provided with a pair of bearings 150 surrounding with zero tolerance the motion drive mandrel 140. A set screw equipped lug 152, interposed between the bracket plates 144 and 146, maintains the mandrel in its bearings.

The depending bracket plate 146 supports a motor 154 laterally of the motion drive guide means 46. A dual pulley idler shaft 156, extending through and journalled by the bracket plates, is interposed between the motor and dial guide. Belts 158 and 160, respectively, are entrained around the idler shaft pulleys, motor drive shaft and periphery of the dial guide body 108 for angular rotation of the dial guide.

The chassis top 22 is further provided with a power on and off switch 162, on and off motor control switch 164 and motor jogging switch 166. The chassis top is further provided with an exposure light switch 168, a light intensity control 170 and a light integrator control panel 172.

OPERATION

The motion drive guide 46 is set at zero position wherein its operation does not move the film board 36, as indicated by the dial arm 98 of the indicator remaining at zero. This occurs when the dial plate 110 is at a zero position, (aligned with the line 112), and the eccentric drive pin 64 is axially aligned with the mandrel 140. This setting at zero is accomplished by operating the motor jog switch 166 for partial angular rotation of the dial guide until the dial plate zero position is aligned with the indicator line 112. The thumb screw 122 is then rotated counterclockwise until the slider is positioned against its stop. The motor 154 is then energized to make certain that the indicator 98 remains at its zero position.

The thumb screw 122 is then rotated clockwise to move the slider 114 and the eccentric pin 64 a desired magnitude. The motor is again energized to visually determine, by the indicator 98, the magnitude of film board orbital motion.

Referring also to FIGS. 10 through 14, a sheet of unexposed film 174 is registered on the uppper surface of the film board 36 by punching one side of the film with register pin holes in a conventional manner to be received by the register pins 86. Two strips of thin double sided cellophane tape 176 are disposed on the film board to secure the respective corner of the film 174. The adhesive on the top surface of the tape 176 is weakened by rubbing with the operator's finger for the purpose presently apparent.

To register the original film 178, to be reproduced, the film carriage 100 is raised against the backboard 18 and a length of double sided adhesive tape 180 is placed on the underside of the film carriage adjacent its forward edge. With the motion drive guide 46 running at its zero position and the film carriage raised, the original film 178, similarly register pin punched, is placed on the register pins 86 and air between the film and film board 36 is manually brushed out and respective corner portions of the original are manually pressed into contact with the one inch adhesive tapes 176. The film carriage is then lowered to overlie the film board and the tape strip 180 is secured to the original 178 by pressing on the top surface of the film carriage 100. The film carriage 100 is then lifted to the backboard wherein the film 178 releases from the tape strips 176 and remains secured to the carriage sheet. A length of film, not shown, is then applied to the adjacent surface of the original 178, by double sided adhesive tape, to cover its register holes and prevent original film hangup on the register pins 86 during the subsequent orbital motion of the film board.

The unexposed film 174 is placed on the register pins 86 and its corners are manually pressed into contact with the tape strips 176. The carriage sheet 100 is then lowered to overlie the film board 36. The motion drive guide is manually set for the desired magnitude of orbital motion. The film 174 is then exposed with a predetermined setting of the light integrator 172. Following exposure, the drive guide is stopped, the film carriage 100 is raised and the exposed film 174 is removed and developed.

FIG. 12 illustrates a plus image on the film 174 when the latter is developed or conversely a plus image negative of the type character when using a duplicating film, not shown, in place of the film 174.

FIG. 13 illustrates an identical operation of the apparatus for producing a minus negative image on a film 182 containing the type character.

FIG. 14 illustrates a fragment of a film containing a graphic image, such as a star 184, to be modified to form a plus image when converted to an outline to show the modification amount, indicated at 186, wherein the acute angle or points of the star image produce a full radius line around the respective tip of the star image, (FIG. 15).

The apparatus is particularly adapted for use in modifying micro circuit diagrams wherein the air gap between adjacent conductors is critical.

Obviously the invention is susceptible to changes or alterations without defeating its practicability. Therefore, I do not wish to be confined to the preferred embodiment shown in the drawings and described herein.

I claim:

1. In a graphics modifier having a chassis defining a horizontal top and a rearward end upstanding backboard and having a moveable film board overlying the chassis top with a transparent film carriage normally superposed on the film board, the improvement comprising:
    under carriage means supported in depending relation by drive rods extending through and fulcrumed by said chassis top and connected with opposing marginal edge portions of said film board for orbital movement in a horizontal path;
    motor guide means supported by said chassis and having an eccentric pin connected with said under carriage means for moving said under carriage means and said film board, respectively, in orbital paths of predetermined magnitude; and,
    motor means drivably connected with said motion guide means.

2. The combination according to claim 1 in which said under carriage means includes:
    an under carriage panel parallel with said chassis top;
    spherical bearing means connecting said drive rods with said under carriage panel, said chassis top and said film board, respectively;
    a countershaft transversely journalled by said chassis adjacent its rearward limit; and,
    arm means including a pair of parallel arms extending between and pivotally connected at their respective end portions with said under carriage panel and respective end portions of said countershaft for maintaining marginal edges of said film board parallel with respective marginal edges of said film carriage.

3. The combination according to claim 2 and further including:
    ball bearing means interposed between said chassis top and said film board.

4. The combination according to claim 3 in which said motion guide means includes:
    a generally cylindrical body having a mandrel projecting coaxially from one end and journalled by said chassis for angular rotation of the body;
    a dial plate overlying said one end of said body and having peripheral indicia thereon indicating a zero position of said motion guide means relative to said chassis;
    a slider slidably secured to the end of said body opposite the mandrel for movement in a diametric direction toward and away from the zero position.
    said eccentric pin projecting outward from said slider coaxial with said mandrel when said slider is at the limit of its movement in one direction; and,
    screw means supported by said body and connected with said slider for disposing the axis of the eccentric pin laterally of the axis of said mandrel.

5. The combination according to claim 4 and further including:
    motion indicator means supported by said chassis adjacent a marginal edge of said film board for visually indicating the magnitude of movement of said film board.

6. The combination according to claim 5 and further including:
    hinge means connecting said film carriage with said chassis for vertical pivoting movement toward and away from said backboard.

* * * * *